United States Patent
Collins et al.

[11] Patent Number: 6,048,554
[45] Date of Patent: Apr. 11, 2000

[54] COMPOSITION AND METHOD FOR COLORING LIVE BAIT

[76] Inventors: Harold D. Collins, Rte. 6, Mountain View Rd., Spartanburg, S.C. 29303; Kim D. Senn, 129 Sprouse Rd., Spartanburg, S.C. 29307

[21] Appl. No.: 09/233,968

[22] Filed: Jan. 20, 1999

Related U.S. Application Data

[63] Continuation-in-part of application No. 08/944,345, Oct. 6, 1997, abandoned.

[51] Int. Cl.⁷ .............................. A23L 1/272; A23L 1/275
[52] U.S. Cl. .................................. 426/1; 426/540; 426/805
[58] Field of Search .................................. 426/1, 805, 540

[56] References Cited

U.S. PATENT DOCUMENTS

| | | | |
|---|---|---|---|
| 3,987,205 | 10/1976 | Stephan | 426/1 |
| 4,144,353 | 3/1979 | Zaragoza | 426/1 |
| 4,728,514 | 3/1988 | Lechnir | 426/1 |
| 5,089,277 | 2/1992 | Prochnow | 426/1 |
| 5,704,951 | 1/1998 | Negir et al. | 8/546 |
| 5,720,779 | 2/1998 | Ebiike et al. | 8/549 |

FOREIGN PATENT DOCUMENTS 236101  9/1987  European Pat. Off. .

*Primary Examiner*—Chhaya D. Sayala
*Attorney, Agent, or Firm*—Leigh Gregory; Cort Flint

[57] ABSTRACT

A composition and method are provided for coloring live bait such as minnows and the like which include dispersing a biological stain, an alkaline agent and a salt in a preferably aqueous carrier medium. The bait is immersed in the solution for a period of time dependent on the degree and length of time of coloring desired. The active ingredients preferably comprise no more than about 0.15% by weight of the total solution. Also disclosed is a pressed tablet, preferably an effervescing tablet, which disperses the active ingredients upon immersion in the carrier medium.

24 Claims, No Drawings

6,048,554

COMPOSITION AND METHOD FOR COLORING LIVE BAIT

The present application is a continuation-in-part of U.S. Ser. No. 08/944,345, filed Oct. 6, 1997, now abandoned.

FIELD OF THE INVENTION

Generally, the present invention is directed to a method for internally and externally coloring live bait such as minnows. More specifically, the present invention is directed to a composition capable of coloring live bait such that the bait not only remains alive subsequent to the application of the composition but also demonstrates a maintained or increased motility.

BACKGROUND OF THE INVENTION

There are a variety of methods disclosed in the prior art for producing desirably colored live bait. Several methods are disclosed for breeding and raising bait such as worms and bait fish such that the resultant bait is colored. However, such methods do not allow a fisherman to color the more readily available non-colored bait as desired.

Accordingly, in recent years several methods have been introduced for coloring live bait. The two primary problems which must be addressed in the development of any such method are 1) providing a colorant which is not toxic to the bait, and 2) providing a colorant which does not readily rinse off the bait.

U.S. Pat. No. 4,728, 514 to Lechnir discloses a method of coloring live bait by immersing the live bait in a dye medium for 2–10 minutes. The dye medium contains water, salt equal to or less than that required for a saturated salt sol and an edible dye in not greater than four times the volume of the salt. The specific edible dye disclosed by Lechnir is a FD&C Red Dye No. 2 which is a mono-azo dye. Lechnir notes that, in the absence of salt, the dye employed is toxic to the live bait. The salt and dye employed by Lechnir comprise on the order of about 10% to about 20% by weight of the total coloring solution.

U.S. Pat. No. 4,776,858 to Mayer is directed to a composition for coloring bait which includes about 10% by weight of at least one biologically acceptable and palatable colorant; about 10% by weight of a mordant for binding the colorant to live bait; about 10% by weight of an acidulant; about 1% by weight of a surfactant; about 4% by weight of a suspending agent; and an aqueous carrier. Mayer discloses a variety of colorants which are selected from mono-azo dyes, triaryl-methane dyes and indigoid dyes.

There remains a need in the fishing art for a non-toxic composition and method for coloring live bait which may be readily employed by the fisherman as needed or which may be achieved overnight in anticipation of an upcoming fishing expedition.

SUMMARY OF THE INVENTION

Accordingly, a method is provided for coloring live bait which includes the steps of providing a carrier medium, dispersing active agents within the carrier medium, the active agents including from about 20% to about 80% by weight of at least one biological stain wherein the biological stain is an amine, thereby forming a coloring solution such that the active agents comprise from about 0.0050% to about 0.15% by weight of the coloring solution, and immersing the bait in the solution for a period of time.

Similarly, a composition is provided for coloring live bait in the form of a solution which includes a carrier medium, and active agents dispersed within the carrier medium, the active agents including from about 20% to about 80% by weight of at least one biological stain wherein the biological stain is an amine, up to about 50% by weight of a halide salt, and up to about 50% by weight of an alkaline agent, such that the active agents comprise from about 0.005% to about 0.15% of the solution.

Also, the present invention provides a minnow which is colored by the process of providing a carrier medium, dispersing active agents within the carrier medium, said active agents including from about 20% to about 80% by weight of at least one biological stain which is an amine, thereby forming a coloring solution such that the active agents comprise from about 0.005% to about 0.15% by weight of the coloring solution, and immersing the minnow in the solution for a period of time.

Furthermore, the present invention is directed to a water soluble powder which effervesces in water which includes active agents including from about 20% to about 80% by weight of at least one biological stain which is an amine, an alkaline agent, and an acid reactive with the alkaline agent in solution to produce carbon dioxide effervescence. Preferably, the water soluble powder is in the form of a pressed tablet.

It is an advantage of the present invention that a method is provided for coloring live bait which may be performed as needed for short-term coloring of the bait or which may be performed for an extended period of time, such as overnight, for long-term coloring of the bait.

It is a further advantage of the present invention that a composition is provided for coloring live bait which may be diluted by the user in order to achieve the degree of coloring desired.

DESCRIPTION OF THE PREFERRED EMBODIMENTS

The present invention is directed to a method and composition for coloring live bait which involves the dispersal of at least one biological stain and at least one further agent, preferably a halide salt or an alkaline agent or both in a carrier medium. The carrier medium is most preferably water, but a variety of polymeric carriers may also be employed in accordance with the present invention. Similarly, a blend of water and a polymer may be employed. A preferred polymer for use in accordance with the present invention is hydroxypropyl methyl cellulose, sold under the trade name Methocel by the Dow Chemical Co., Midland, Mich.

It has been found in accordance with the present invention that biological stains which belong to the chemical class of amine dyes may be employed in combination with appropriate alkaline agents and salts as active agents for coloring live bait. Most preferred are Rhodamine B, Color Index (C.I.) No. 45170, and Bismarck Brown Y, C.I. No. 21000, both available from Aldrich Chemical Company, Inc., Milwaukee, Wis., although other amine dyes may also be employed. Examples of other amine-type dyes which may be employed as the biological stain in accordance with the present invention are Basic Fuchsin, which produces a violet color and is classified under C.I. No. 42510, Brilliant Green, C.I. No. 42040, Crystal Violet, another violet classified under C.I. No. 42555, Methylene Blue, C.I. No. 52015, and Toluidine Blue 0, C.I. No. 52040. Depending on the color desired for the live bait, one or more biological stains may be employed. For example, Bismarck Brown Y may be employed to achieve a gold color, Rhodamine B may be employed to achieve a pink color, and a blend of the two may be employed to achieve an orange color. Preferably, the stain or stains employed comprise from about 20% to about 80% by weight of all active agents. Most preferably, the stain or stains comprise from about 20% to about 70% by weight of all active agents. The optimum amount of stain will vary depending the particular stain or stains being used and the intensity of color desired.

In one preferred embodiment the biological stain employed may be a fluorescing agent, as is the case for Rhodamine B.

Preferably a salt is employed in the present composition, most preferably sodium chloride, although potassium chloride, calcium chloride or magnesium chloride may also be employed. Generally, other halides may or may not be too toxic to the live bait to be employed in accordance with the present invention. It is believed that the salt of the present composition is effective in reducing the solubility of the amine dye such that the dye is less likely to remain in solution and more likely to react with the proteinaceous surface of the bait. Preferably, the salt comprises up to about 50% of all active agents. Most preferably, the salt comprises from about 20% to about 40% of all active agents.

Most preferably, the present active agents include an alkaline agent. The preferred alkaline agent is sodium carbonate; although potassium carbonate, calcium carbonate or magnesium carbonate may also be employed. Generally, carbonates are preferred for use as the alkaline agent because they are relatively weak bases; although other similarly weak bases may also be used in accordance with the present invention. For example, bicarbonates may be employed at reduced concentrations. It has been found that stronger bases are often toxic to the live bait being colored. It is believed that the alkaline agent of the present composition is effective in reducing protonation of the amine dye in solution such that the dye is drawn to the proteinaceous surface of the live bait. Preferably, the alkaline agent comprises up to about 50% of all active agents. Most preferably, the alkaline agent comprises from about 20% to about 40% of all active agents. The optimum amount of alkaline agent will depend on the particular alkaline agent being used as well as the stain or stains being used.

Generally, the active agents are dispersed in the carrier medium in an amount of from about 0.005% to about 0.15% of the total solution. For coloring live minnows in a five minute process it is preferred that the active agents comprise from about 0.04% to about 0.08% by weight of the solution. The five minute coloring process in accordance with the present invention will provide colored bait which maintains the color for about three to about five hours. For a twelve hour coloring process it is preferred that the active agents comprise from about 0.01% to about 0.02% by weight of the solution. The twelve hour process provides stained bait which retains its color for at least twelve hours and typically for two to three days. A cross section of a minnow stained by the twelve hour process shows both internal as well as external coloration, while a minnow colored by the five minute process exhibits only external coloration. Intermediate dwell times will be effective for coloring bait at intermediate concentrations. Live bait may also be colored nearly instantaneously by immersing the bait in a concentrate of coloring solution in accordance with the present invention. That is, it has been found that bait minnows may be held in a 0.10% solution of active agents of the present composition for about five seconds. Exposure for such a limited period of time is not toxic to the bait and is sufficient for imparting a desirable, temporary color to the bait which is not immediately rinsed off upon immersion of the bait in the water being fished. This latter process is especially useful for fisherman who desire to color at least a portion of their bait on-the-spot, while fishing.

As used herein, the terms "color" or "coloring" generally refer to a chemical process which stains or dyes the bait. As noted above, the bait will exhibit only a temporary, external coloration following a short-term exposure to the composition of the present invention. Long-term exposure to the present composition at non-toxic concentration levels results in both internal and external coloration as the bait ingests the composition. The temporary nature of the staining is also extended for such increased dwell times.

Although it is generally preferred that the present composition is supplied in the form of a concentrate which may be diluted by the user in order to practice a coloring process of a desired time length, or for immediate, short-term coloring of the bait as described above, the present composition may be supplied in any of a number of forms. For example, in a concentrated form the present composition may be supplied as a spray. For such embodiment, a polymeric carrier, in addition to or in place of the more generally preferred aqueous carrier, may be employed. Alternatively, the active agents of the present composition, which are generally available in powder form, may be supplied as a powder or pressed tablet to be dissolved in an appropriate amount of a carrier medium by the end-user. If a pressed tablet is supplied it preferably includes a filler or a binder such as maltodextrin or other commonly used binders. Most preferably, the tablet includes an alkaline agent, preferably the optional alkaline agent of the present composition, and further includes an acid, such that upon immersion in an aqueous medium the tablet produces carbon dioxide effervescence. Preferred alkaline agents for use in an effervescing tablet in accordance with the present invention include the carbonates and bicarbonates which are the preferred alkaline agents of the present composition. Preferred acids include citric acid, malic acid, tartaric acid and fumaric acid. Effervescence is desirable because it aids in dispersing the active agents in the carrier medium. Generally, the alkaline agent is present in an amount necessary to neutralize the acid in addition to that amount, if any, necessary for effectively coloring the bait.

Although the composition and process of the present invention are particularly suited for coloring minnows, other types of live bait such as, for example, worms, crickets, and crawfish, may also be treated accordingly. Generally, the active agents of the present composition have been found to be non-toxic to bait at the concentrations required. In fact, it has unexpectedly been found that minnows not only live, but thrive, in the present composition as designated for the twelve hour coloring process. As with all water-borne bait to be maintained for any extended length of time, it is preferred that the aqueous carrier is maintained at relatively cool temperatures, generally between about 50° C. and about 65° C. Most preferably, the water is aerated.

The following examples are representative of preferred compositions and processes in accordance with the present invention.

EXAMPLE 1

Preparation of a Pink Concentrate

Four ounces (118.32 grams) of filtered water were heated to about 180° F. The active agents were added to the water in the following order: 0.210 g. Rhodamine B, 0.165 g. $Na_2CO_3$, and 0.165 g. NaCl.

EXAMPLE 2

Preparation of a Pink Coloring Solution for the Five Minute Process

A four ounce pink concentrate made in accordance with the method of Example 1 was mixed with 800 milliliters of water. Live minnows were placed in the solution for about five minutes. Upon removal from the solution the minnows exhibited a pink coloration. The pink color remained on the minnows upon immersion into a fresh water bath and was maintained for about five hours.

EXAMPLE 3

Preparation of a Pink Coloring Solution for the Twelve Hour Process

A four ounce pink concentrate made in accordance with the method of Example 1 was mixed with 4,000 milliliters of water. Live minnows were placed in the solution overnight for about twelve hours. Upon removal from the solution the minnows exhibited a pink coloration. The pink color remained on the minnows upon immersion into a fresh water bath and was maintained for about two days.

EXAMPLE 4

Field Test of Minnows Stained Pink by the Twelve Hour Method

Minnows colored pink by the twelve hour method were compared to plain minnows in twenty separate fishing trials. Fishing lines were set up in a line along the same side of a fishing boat. The bait employed on each line alternated between plain and colored, such that the first and third lines had plain minnows and the second and fourth lines had pink minnows. On average, five to seven fish were caught with pink minnows for each fish caught with a plain minnow. The fish caught included striped bass, small and large mouth bass, hybrids, crappie, trout, bream, catfish, and perch.

EXAMPLE 5

Preparation of a Gold Concentrate

Four ounces (1 18.32 grams) of filtered water were heated to 180° F. The active agents were added to the water in the following order: 0.182 g. Bismarck Brown Y, 0.163 g. $Na_2CO_3$, and 0.163 g. NaCl.

EXAMPLE 6

Preparation of a Gold Coloring Solution for the Five Minute Process

A four ounce gold concentrate made in accordance with the method of Example 5 was mixed with 800 milliliters of water. Live minnows were placed in the solution for about five minutes. Upon removal from the solution the minnows exhibited a gold coloration. The gold color remained on the minnows upon immersion into a fresh water bath and was maintained for about five hours.

EXAMPLE 7

Preparation of a Gold Coloring Solution for the Twelve Hour Process

A four ounce gold concentrate made in accordance with the method of Example 5 was mixed with 4,000 milliliters of water. Live minnows were placed in the solution overnight for about twelve hours. Upon removal from the solution the minnows exhibited a gold coloration. The gold color remained on the minnows upon immersion into a fresh water bath and was maintained for about two days.

EXAMPLE 8

Preparation of an Orange Concentrate

Four ounces (118.32 grams) of filtered water were heated to about 180° F. The active agents were added to the water in the following order: 0.182 g. Bismarck Brown Y, 0.146 g. Rhodamine B, 0.163 g. $Na_2CO_3$, and 0.163 g. NaCl.

EXAMPLE 9

Preparation of a Orange Coloring Solution for the Five Minute Process

A four ounce orange concentrate made in accordance with the method of Example 8was mixed with 800 milliliters of water. Live minnows were placed in the solution for about five minutes. Upon removal from the solution the minnows exhibited an orange coloration. The orange color remained on the minnows upon immersion into a fresh water bath and was maintained for about five hours.

EXAMPLE 10

Preparation of a Orange Coloring Solution for the Twelve Hour Process

A four ounce orange concentrate made in accordance with the method of Example 8was mixed with 4,000 milliliters of water. Live minnows were placed in the solution overnight for about twelve hours. Upon removal from the solution the minnows exhibited an orange coloration. The orange color remained on the minnows upon immersion into a fresh water bath and was maintained for about two days.

EXAMPLE 11

Preparation of a Purple-rose Concentrate

One hundred twenty milliliters of filtered water were heated to about 180° F. The following active agents were added to the water in the following amounts: 0.20 g Rhodamine B, 0.05 g. Toluidine Blue 0, 0.163 g. NaCl.

EXAMPLE 12

Preparation of a Purple-rose Concentrate

Four ounces of filtered water were heated to about 180° F. The following active agents were added to the water in the following amounts: 0.20 g Rhodamine B, 0.046 g. Toluidine Blue 0, 0.166 g. $Na_2CO_3$.

EXAMPLE 13

Preparation of a Purple-rose Coloring Solution for the Five Minute Process

A four ounce purple-rose concentrate made in accordance with the method of Example 12 was mixed with water to form a 800 milliliter solution. Live minnows were placed in the solution for five minutes. The purple-rose color remained on the minnows upon immersion in a fresh water bath and was maintained for at least two hours. All minnows were still alive after twelve hours.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. For example, it should be understood that a minnow which is immersed for three minutes in one of the coloring solutions designated for the five minute method clearly will exhibit some degree of coloration. Similarly, the twelve hour method is designed to accommodate overnight coloring and will prove useful for bait immersed from six to fifteen hours or longer. In fact, some bait will survive and thrive in the solution designed for the twelve hour method for a period of days.

Rather, the embodiments described above were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method for coloring live bait comprising:

providing a carrier medium;

dispersing active agents within the carrier medium, said active agents comprising from about 20% to about 80% by weight of at least one biological stain, said biological stain comprising an amine, thereby forming a coloring solution such that the active agents comprise from about 0.005% to about 0.15% by weight of the coloring solution; and immersing the bait in the solution for a period of time.

2. The method set forth in claim 1 wherein the biological stain comprises Bismarck Brown.

3. The method set forth in claim 1 wherein the biological stain comprises Rhodamine B.

4. The method set forth in claim 2 further including Rhodamine B as a further biological stain.

5. The method set forth in claim 1 wherein the active agents comprise from about 0.04% to about 0.08% by weight of the coloring solution and wherein the bait is immersed in the solution for five minutes.

6. The method set forth in claim 1 wherein the active agents comprise from about 0.01% to about 0.02% by weight of the coloring solution and wherein the bait is immersed in the solution for 12 hours.

7. The method set forth in claim 1 wherein the carrier medium is water.

8. The method set forth in claim 1 wherein the carrier medium is a polymeric carrier.

9. The method set forth in claim 1 wherein the at least one biological stain is a fluorescing agent.

10. The method set forth in claim 1 wherein the active agents further comprise a halide salt.

11. The method set forth in claim 10 wherein the active agents further comprise NaCl.

12. The method set forth in claim 1 wherein the active agents further comprise an alkaline agent.

13. The method set forth in claim 12 wherein the alkaline agent comprises $Na_2CO_3$.

14. A composition for coloring live bait comprising a solution comprising:

a carrier medium; and active agents dispersed within said carrier medium, said active agents comprising from about 20% to about 80% by weight of at least one biological stain, said biological stain comprising an amine, up to about 50% by weight of a halide salt, and up to about 50% by weight of an alkaline agent;

whereby said active agents comprise from about 0.005% to about 0.15% of the solution.

15. The composition set forth in claim 14 wherein the biological stain comprises Bismarck Brown.

16. The composition set forth in claim 14 wherein the biological stain comprises Rhodamine B.

17. The composition set forth in claim 15 further including Rhodamine B as a further biological stain.

18. The composition set forth in claim 14 wherein the biological stain comprises Toluidine Blue O.

19. The composition set forth in claim 14 wherein the carrier medium is water.

20. The composition set forth in claim 14 wherein the carrier medium is a polymeric carrier.

21. The composition set forth in claim 14 wherein the at least one biological stain is a fluorescing agent.

22. A minnow colored by the process comprising:

providing a carrier medium;

dispersing active agents within the carrier medium, said active agents comprising from about 20% to about 80% by weight of at least one biological stain, said biological stain comprising an amine, thereby forming a coloring solution such that the active agents comprise from about 0.005% to about 0.15% by weight of the coloring solution; and immersing the minnow in the solution for a period of time.

23. A water soluble powder which effervesces in water comprising:

active agents comprising from about 20% to about 80% by weight of at least one biological stain, said biological stain comprising an amine;

an alkaline agent; and an acid reactive with the alkaline agent in solution to produce carbon dioxide effervescence.

24. The water soluble powder set forth in claim 23 in the form of a pressed tablet.

* * * * *